(12) United States Patent
Gonzalez Cruz (10) Patent No.: US 12,179,678 B2
(45) Date of Patent: Dec. 31, 2024

(54) RELAY BOX BRACKET ASSEMBLY

(71) Applicant: NISSAN NORTH AMERICA, INC., Franklin, TN (US)

(72) Inventor: Claudia Gonzalez Cruz, Estado de Mexico (MX)

(73) Assignee: Nissan North America, Inc., Franklin, TN (US)

( * ) Notice: Subject to any disclaimer, the term of this patent is extended or adjusted under 35 U.S.C. 154(b) by 418 days.

(21) Appl. No.: 17/584,195

(22) Filed: Jan. 25, 2022

(65) Prior Publication Data

US 2023/0256920 A1 Aug. 17, 2023

(51) Int. Cl.
*B60R 16/02* (2006.01)

(52) U.S. Cl.
CPC ................ *B60R 16/0215* (2013.01)

(58) Field of Classification Search
CPC .... B60R 16/0215; H02G 3/088; F16B 13/045
See application file for complete search history.

(56) References Cited

U.S. PATENT DOCUMENTS

| | | | | |
|---|---|---|---|---|
| 7,275,649 B2 * | 10/2007 | Ferran Palau | ...... | B60R 16/0238 220/3.3 |
| 8,931,653 B2 * | 1/2015 | Kita | ........ | H02G 3/08 220/3.9 |
| 9,431,805 B2 * | 8/2016 | Suzuki | ...... | H02G 3/08 |
| 10,293,764 B2 * | 5/2019 | Yamao | ...... | B60R 16/0215 |
| 11,183,823 B2 * | 11/2021 | Ishii | ...... | B60R 16/0238 |
| 2010/0326690 A1 * | 12/2010 | Ejima | ...... | B60R 16/0238 174/50 |
| 2021/0098978 A1 * | 4/2021 | Ishii | ...... | H02G 3/081 |
| 2021/0402871 A1 * | 12/2021 | De La Rosa | ...... | B60R 13/005 |

FOREIGN PATENT DOCUMENTS

| | | |
|---|---|---|
| JP | 2012-19615 A | 1/2012 |
| JP | 6482382 B2 | 2/2019 |
| WO | 2015/083521 A1 | 6/2015 |

* cited by examiner

*Primary Examiner* — Monica E Millner
(74) *Attorney, Agent, or Firm* — Global IP Counselors, LLP (57) ABSTRACT

A bracket assembly for a relay box for a vehicle includes a first bracket member and a second bracket member. The first bracket member is configured to be mounted to a frame of the vehicle. The first bracket member is configured to receive the relay box in an installed position. The second bracket member is connected to the first bracket member. A gap is defined between the first bracket member and the second bracket member. The gap is configured to receive an electrical wiring harness connected to the relay box to support the relay box prior to the relay box being mounted in the installed position.

19 Claims, 10 Drawing Sheets

RELAY BOX BRACKET ASSEMBLY

BACKGROUND

Technical Field

The present disclosure generally relates to a relay box bracket assembly. More specifically, the present disclosure relates to a bracket assembly that supports a relay box prior to installation in a vehicle.

Background Information

Installing components in an engine compartment of a vehicle can be difficult. A minimal amount of space is available in the engine compartment for installation of components. An electrical wiring harness is disposed in the vehicle prior to installation of a vehicle engine and an air intake system. A relay box connected to an end of the electrical wiring harness occupies space in the engine compartment such that installation of the air intake system and connecting the air intake system to the engine is difficult.

SUMMARY

In view of the state of the known technology, one aspect of the present disclosure is to provide a bracket assembly for a relay box for a vehicle including a first bracket member and a second bracket member. The first bracket member is configured to be mounted to a frame of the vehicle. The first bracket member is configured to receive the relay box in an installed position. The second bracket member is connected to the first bracket member. A gap is defined between the first bracket member and the second bracket member. The gap is configured to receive an electrical wiring harness connected to the relay box to support the relay box prior to the relay box being mounted in the installed position.

Another aspect of the present disclosure is to provide a relay box assembly for a vehicle. A bracket assembly is connected to a vehicle frame. A relay box is connected to the bracket assembly. An electrical wiring harness is connected to the relay box. The bracket assembly includes a first bracket member connected to the vehicle frame, and a second bracket member connected to the first bracket member. A gap is being defined between the first bracket member and the second bracket member. The gap is configured to receive the electrical wiring harness connected to support the relay box prior to the relay box being connected to the first bracket member of the bracket assembly. The relay box is movable between a first position in which the electrical wiring harness is received by the second bracket member and a second position in which the relay box is connected to the first bracket member.

Also other objects, features, aspects and advantages of a relay box bracket assembly will become apparent to those skilled in the art from the following detailed description, which, taken in conjunction with the annexed drawings, discloses exemplary embodiments of the relay box bracket assembly.

BRIEF DESCRIPTION OF THE DRAWINGS

Referring now to the attached drawings which form a part of this original disclosure.

DETAILED DESCRIPTION OF EXEMPLARY EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
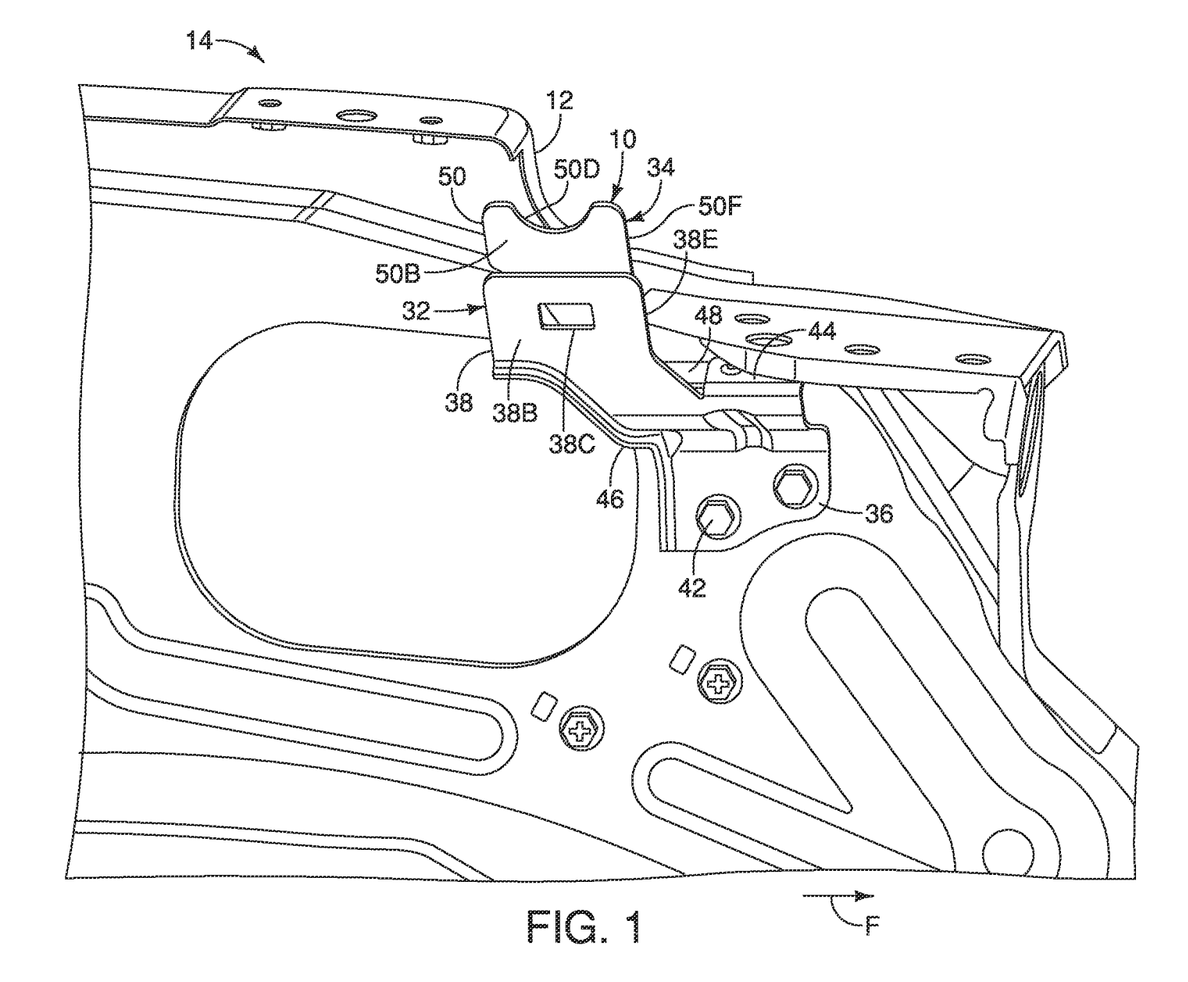
FIG. 1 is a perspective view of a relay box bracket assembly connected to a vehicle frame.
Figure 2:
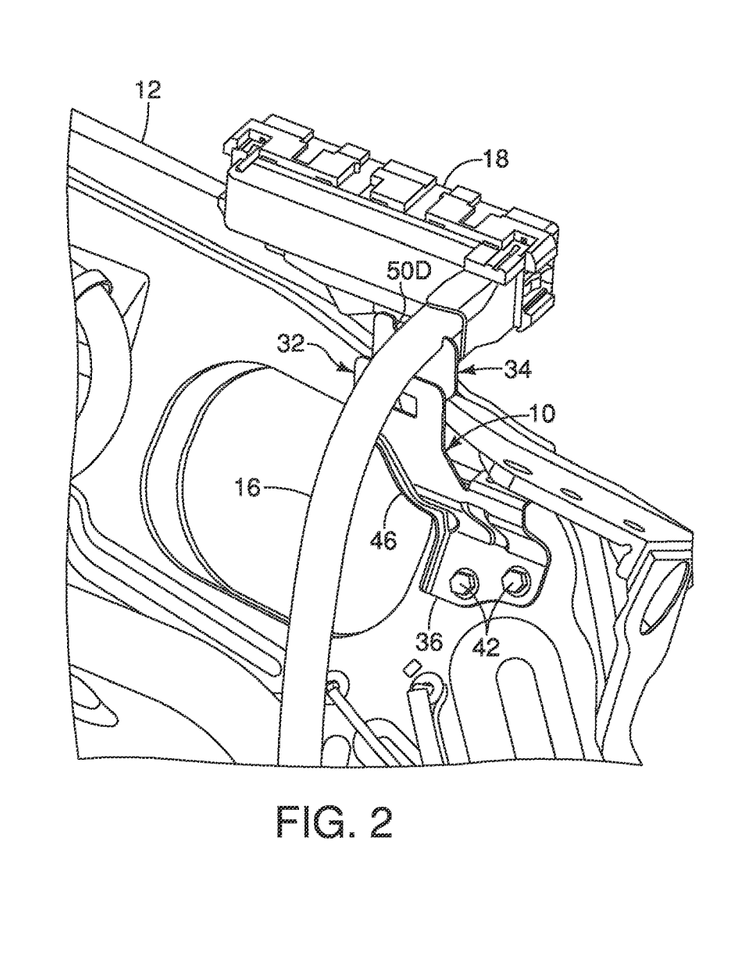
FIG. 2 is a perspective view of an electrical wiring harness received in a first position by the relay box bracket assembly of FIG. 1.
Figure 3:
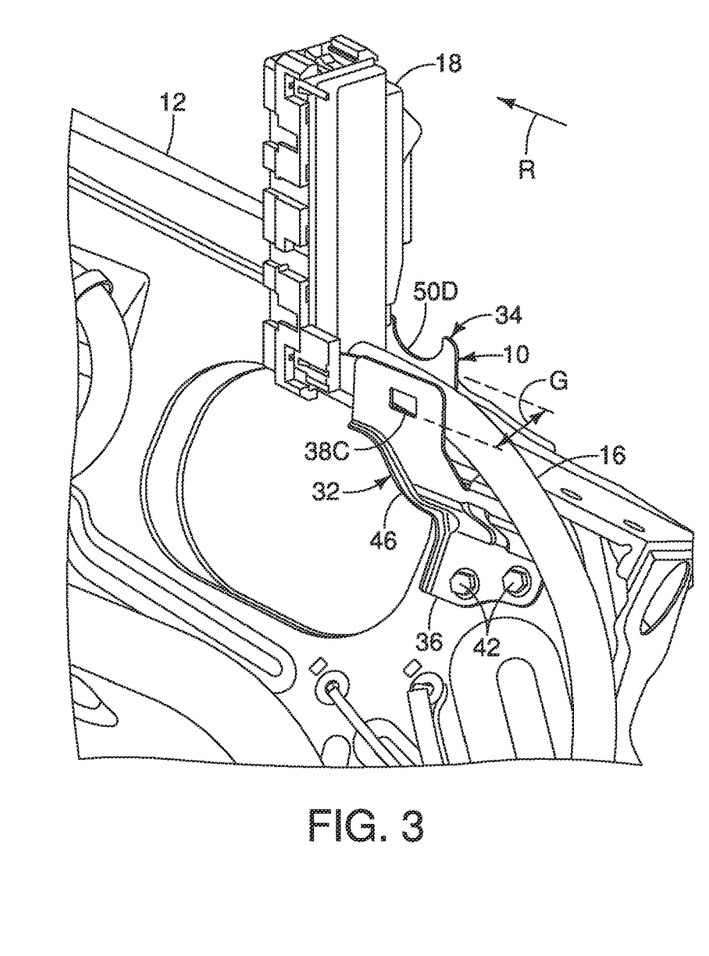
FIG. 3 is a perspective view of an electrical wiring harness received in a second position by the relay box bracket assembly of FIG. 1.

Referring initially to FIGS. 1-3, a relay box bracket assembly 10 is illustrated in accordance with an exemplary embodiment. The relay box bracket assembly 10 is connected to a vehicle frame 12 of a vehicle 14. An electrical wiring harness 16 includes a relay box 18 connected to an end of the electrical wiring harness 16, as shown in FIGS. 2 and 3. The relay box bracket assembly 10 is configured to receive the electrical wiring harness 14 in a first position, as shown in FIG. 2, or a second position, as shown in FIG. 3, prior to the relay box 18 being installed in the vehicle 14, as shown in FIGS. 4-7. The relay box 18 includes a plurality of relays and fuses to control the flow of electrical current in the vehicle 14.

Figure 4:
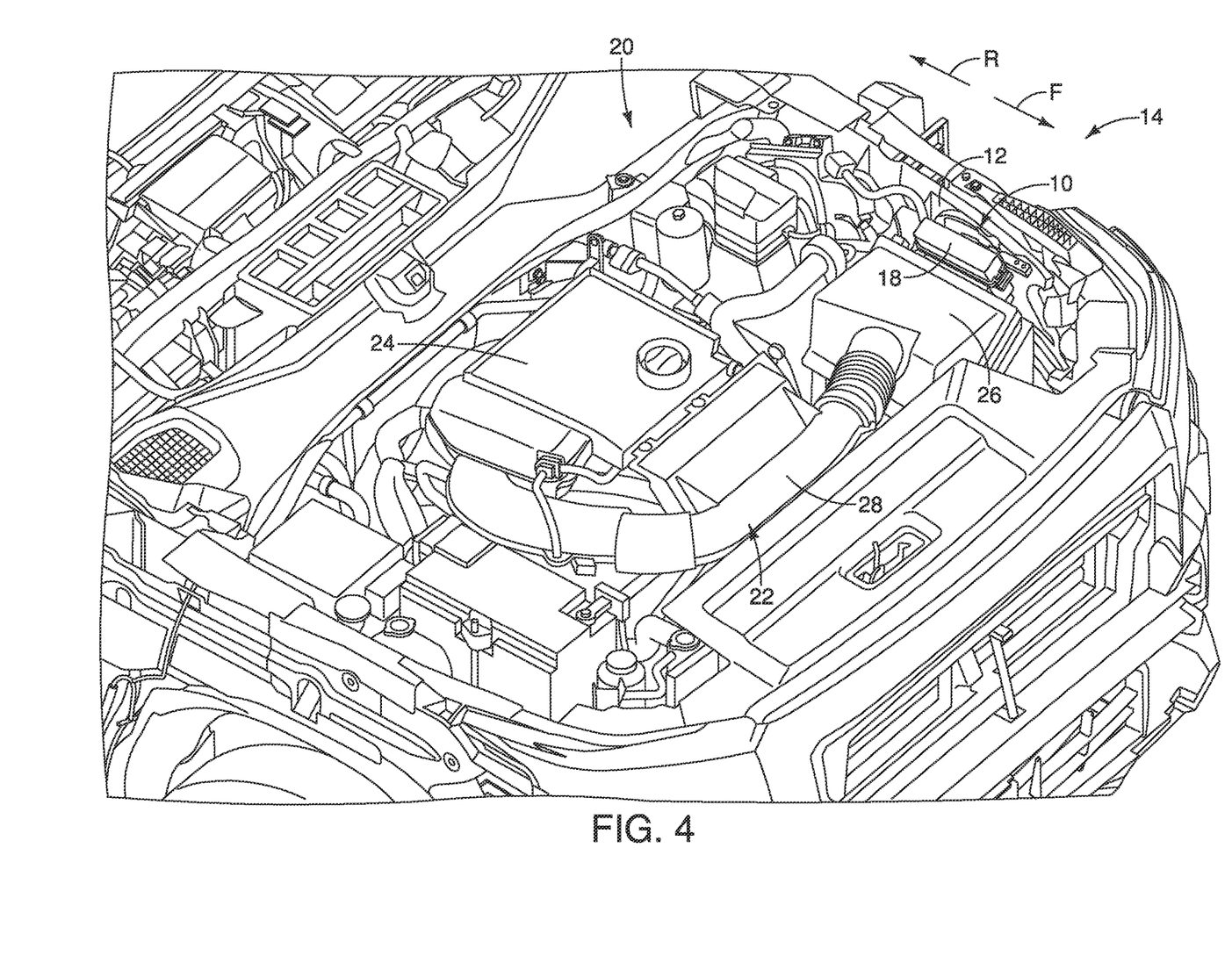
FIG. 4 is a perspective view of a vehicle engine compartment in which the relay box is received in an installed position by the relay box bracket assembly of FIG. 1.
Figure 5:
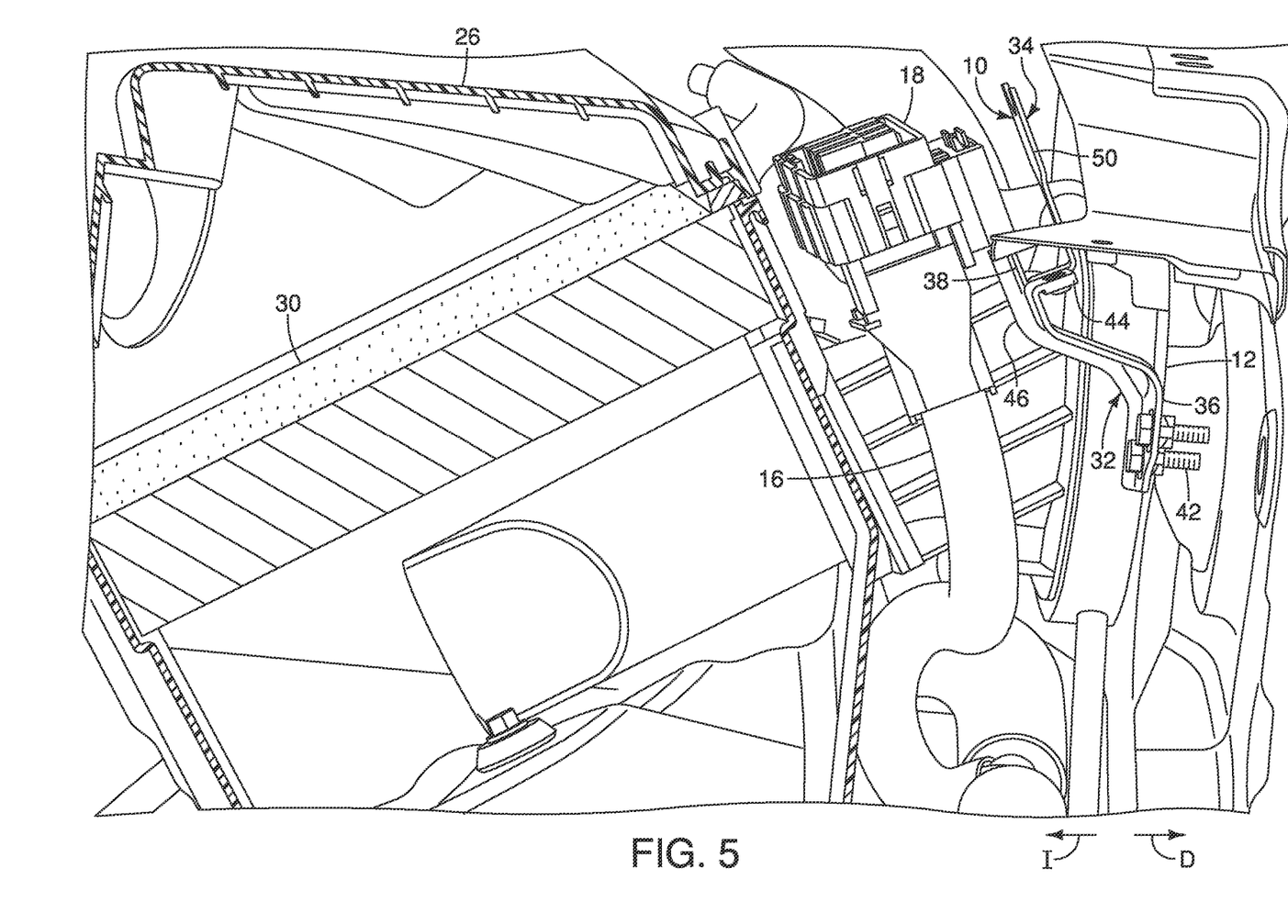
FIG. 5 is a front perspective view of the relay box bracket assembly receiving a relay box of the electrical wiring harness of FIG. 4.

An engine compartment 20 of the vehicle 14 includes an air intake system 22 that supplies air to an engine 24 of the vehicle 14, as shown in FIGS. 4 and 5. The air intake system 22 includes an air box 26 and an air duct 28. The air box 26 includes a filter 30 to remove dirt and other foreign debris from the air to be supplied to the engine 24. The air is supplied from the air box 26 to the engine 24 by the air duct 28.

Figure 9:
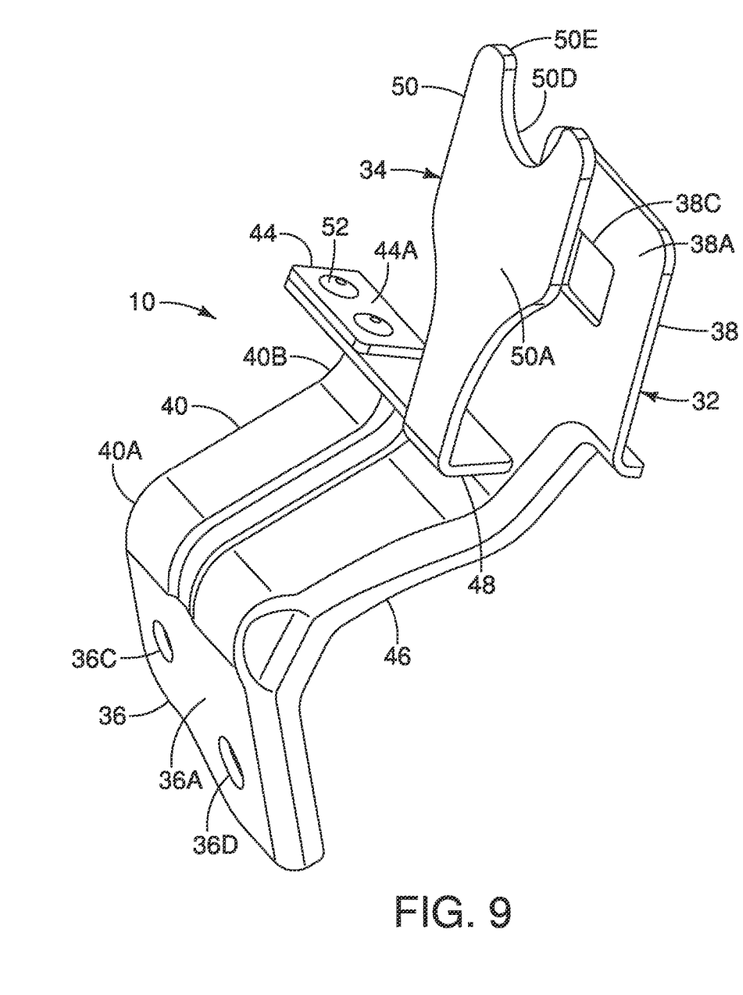
FIG. 9 is a rear perspective view of the relay box bracket assembly of FIG. 8.
Figure 10:
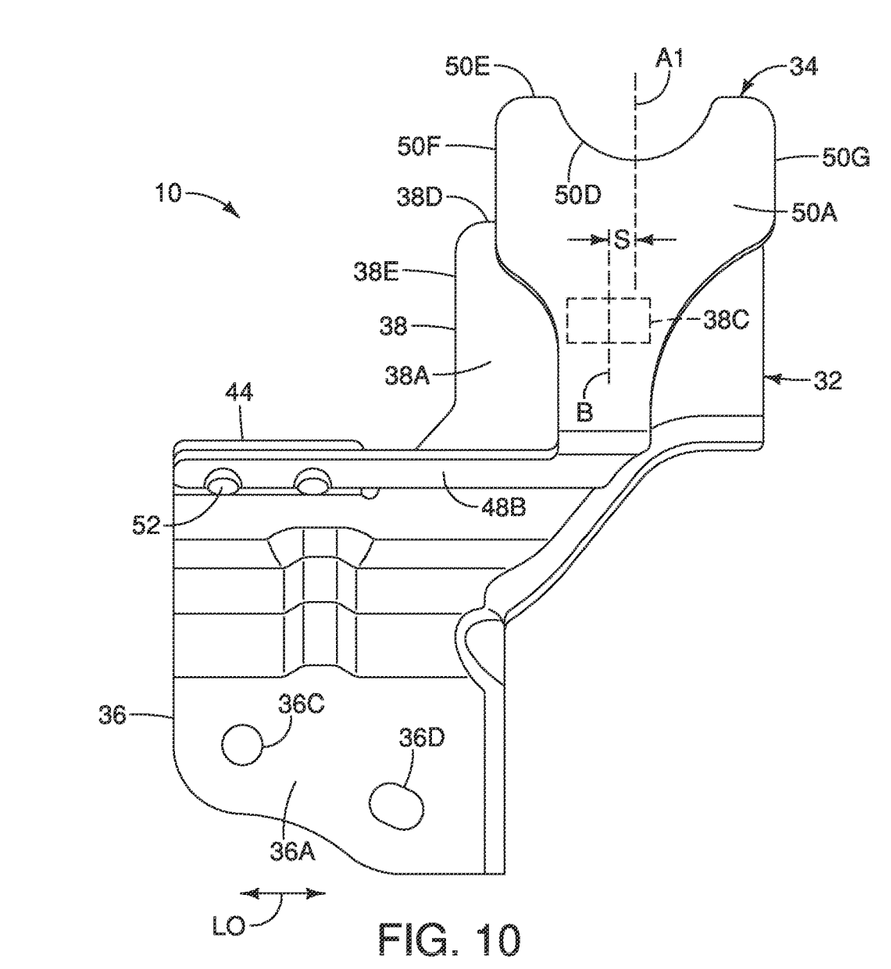
FIG. 10 is a rear elevational view of the relay box bracket assembly of FIG. 8.
Figure 11:
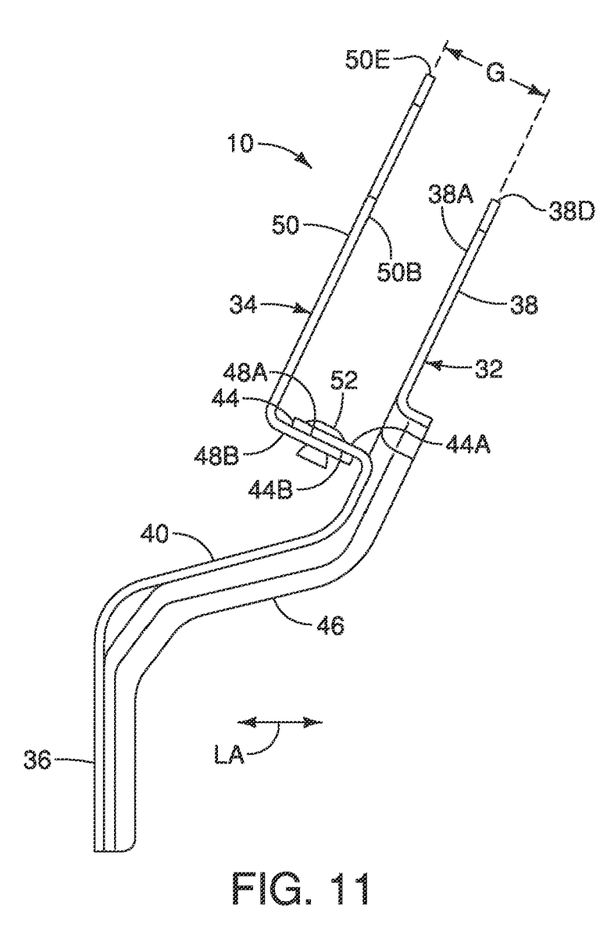
FIG. 11 is a side elevational view of the relay box bracket assembly of FIG. 8.

The relay box bracket assembly 10 includes a first bracket member 32 and a second bracket member 34, as shown FIGS. 8-15. The first bracket member 32 is configured to be mounted to the vehicle frame 12, as shown in FIGS. 1-3 and 5. The first bracket member 32 is configured to receive the relay box 18 in an installed position, as shown in FIGS. 4-7. The second bracket member 34 is connected to the first bracket member 32. The second bracket member 34 is configured to receive the electrical wiring harness 16 in a first position, as shown in FIG. 2, or in a second position, as shown in FIG. 3, prior to installing the relay box 18 in the vehicle 14. A gap G is defined between the first bracket member 32 and the second bracket member 34, as shown in FIGS. 3 and 11. The gap G is configured to receive the electrical wiring harness 16 in the second position, as shown in FIG. 3, prior to installing the relay box 18 in the vehicle 14.

Figure 6:
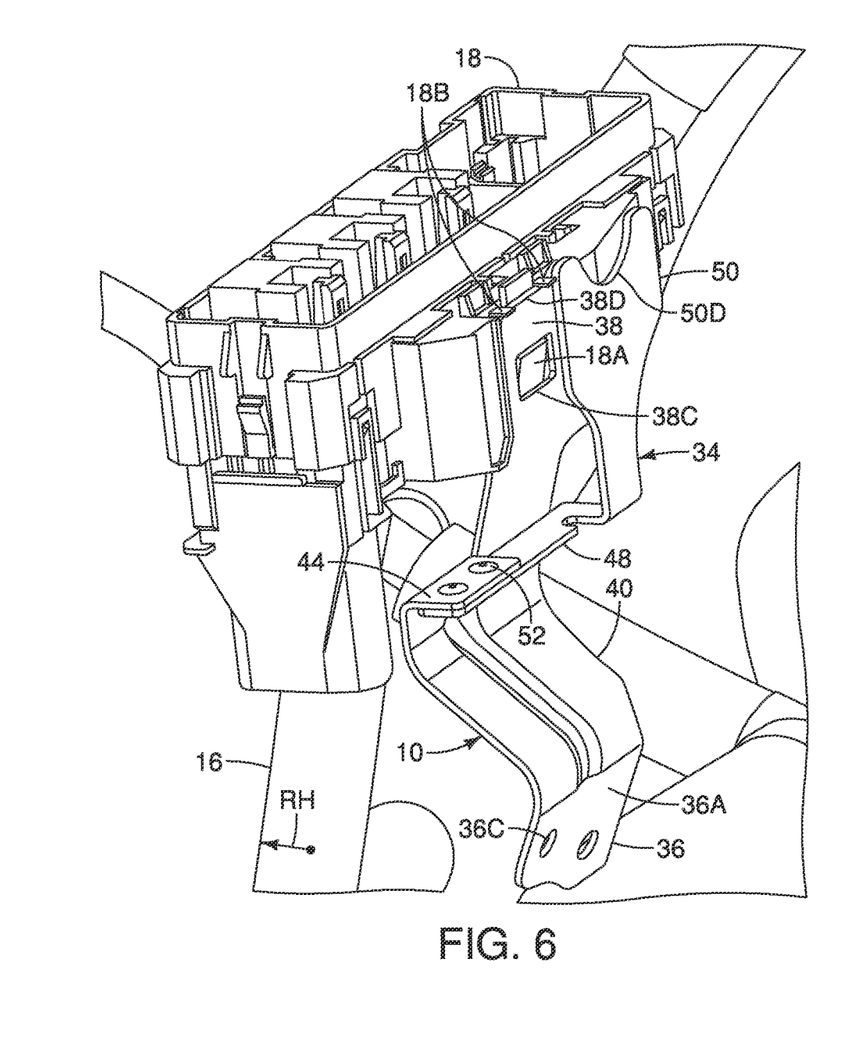
FIG. 6 is a side perspective view of the relay box bracket assembly receiving the relay box of FIG. 5.
Figure 7:
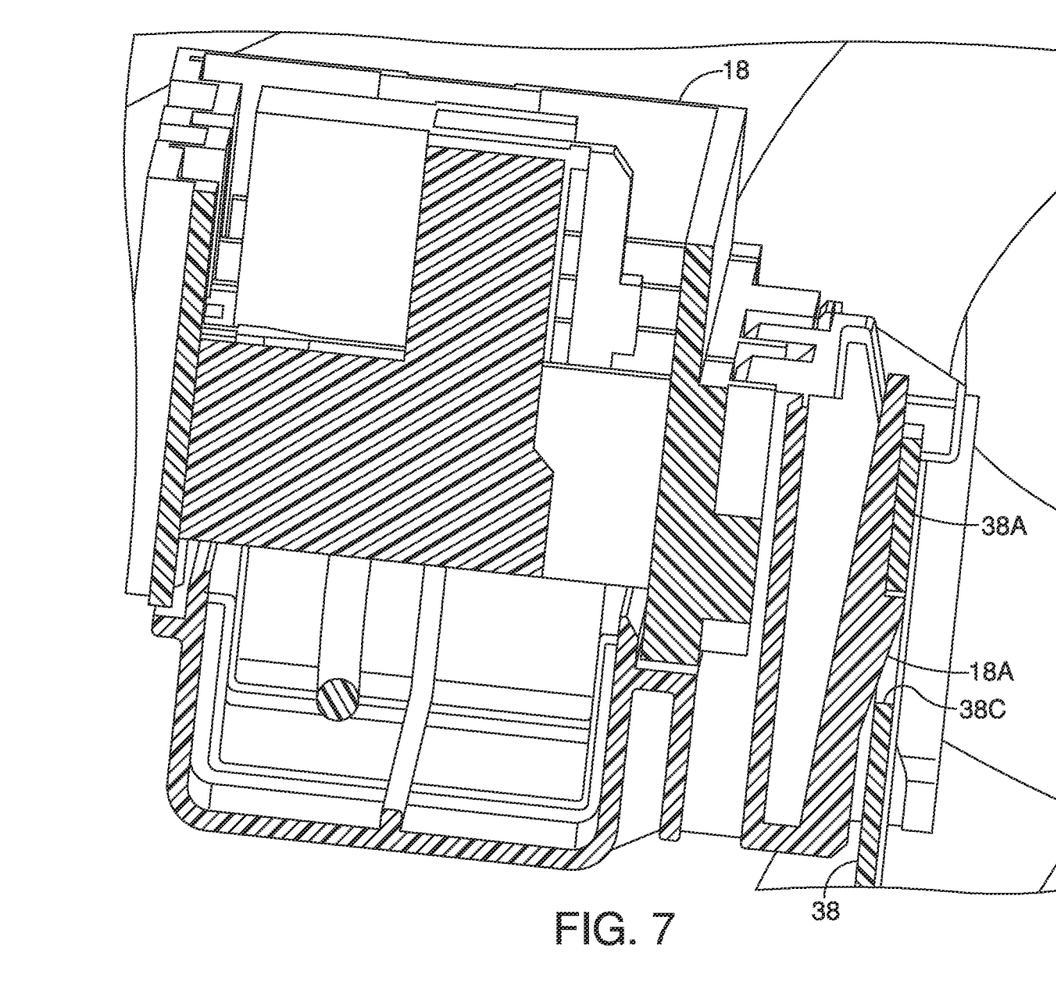
FIG. 7 is a front elevational view in cross section of the relay box bracket assembly receiving the relay box of FIG. 6.
Figure 8:
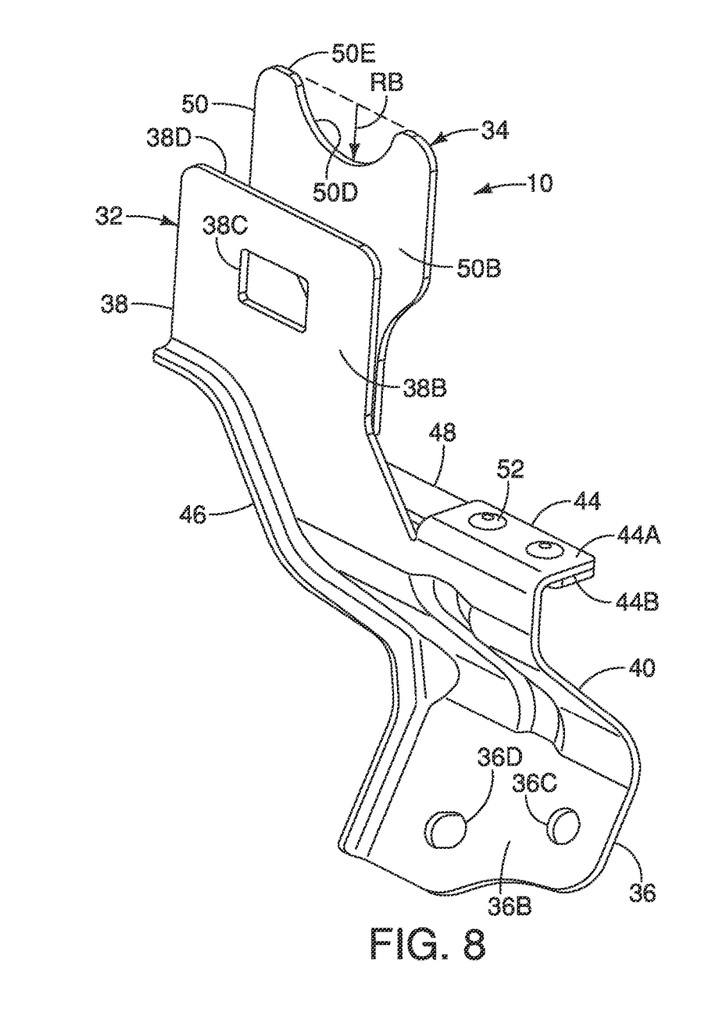
FIG. 8 is a front perspective view of the relay box bracket assembly of FIG. 1.

The first bracket member 32, as shown in FIGS. 8-13, includes a first mounting member 36 and a second mounting member 38. The first mounting member 36 is configured to be connected to the vehicle frame 12, as shown in FIG. 5. The second mounting member 38 is configured to receive the relay box 18 in the installed position, as shown in FIGS. 6 and 7. A first connecting member 40 connects the first mounting member 36 and the second mounting member 38, as shown in FIGS. 8 and 9. The first bracket member 32 is preferably unitarily formed as a one-piece member. The first bracket member 32 is made of any suitable material, such as stainless steel.

The first mounting member 36 of the first bracket member 32 is a substantially planar member having a first surface 36A and an oppositely disposed second surface 36B, as shown in FIGS. 9-13. At least one fastener opening 36C extends through the first mounting member 36 from the first surface 36A to the second surface 36B. The first mounting member 36 is illustrated as having two fastener openings 36C, although the first mounting member 36 can have any suitable number of fastener openings. The fastener openings 36C are configured to receive fasteners 42 to connect the bracket assembly 10 to the vehicle frame 12. As shown in FIGS. 8 and 10, one of the fastener openings 36D is elongated to facilitate connecting the bracket assembly 10 to the vehicle frame 12. The first surface 36A faces in an outboard direction O (FIG. 5) of the vehicle 14 and the second surface 36B faces in an inboard direction I (FIG. 5) of the vehicle 14 when the bracket assembly 10 is connected to the vehicle frame 12.

The second mounting member 38 of the first bracket member 32 is a substantially planar member having a first surface 38A and an oppositely disposed second surface 38B. An opening 38C extends through the second mounting member 38 from the first surface 38A to the second surface 38B. The first surface 38A faces in the outboard direction O (FIG. 5) of the vehicle 14 and the second surface 38B faces in an inboard direction I (FIG. 5) of the vehicle 14 when the bracket assembly 10 is connected to the vehicle frame 12.

Figure 12:
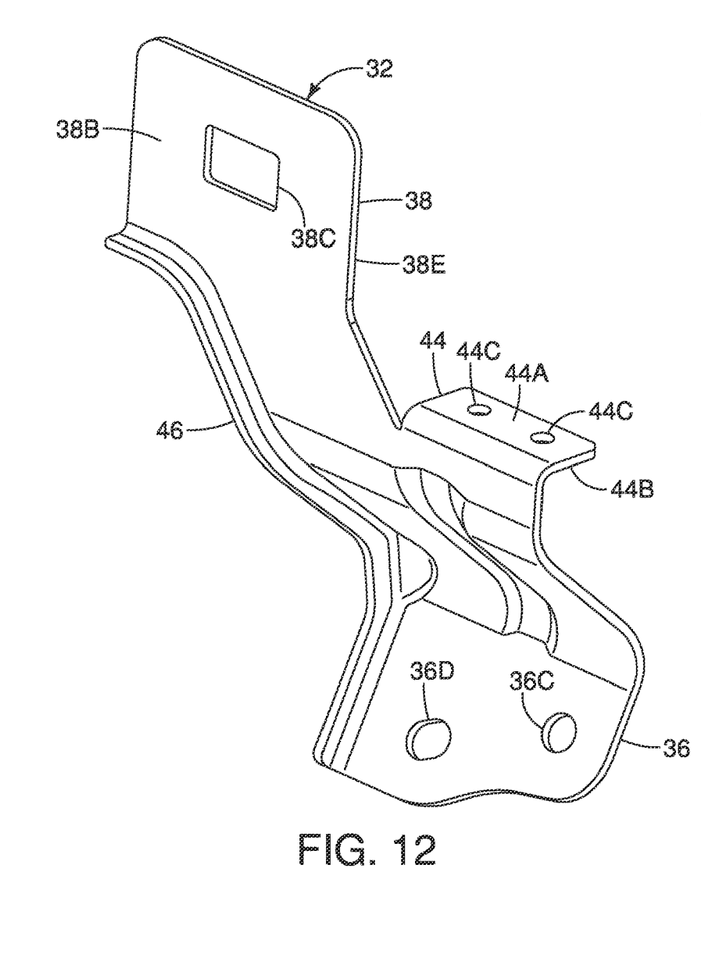
FIG. 12 is a perspective view of a first bracket member of the relay box bracket assembly of FIG. 8.
Figure 13:
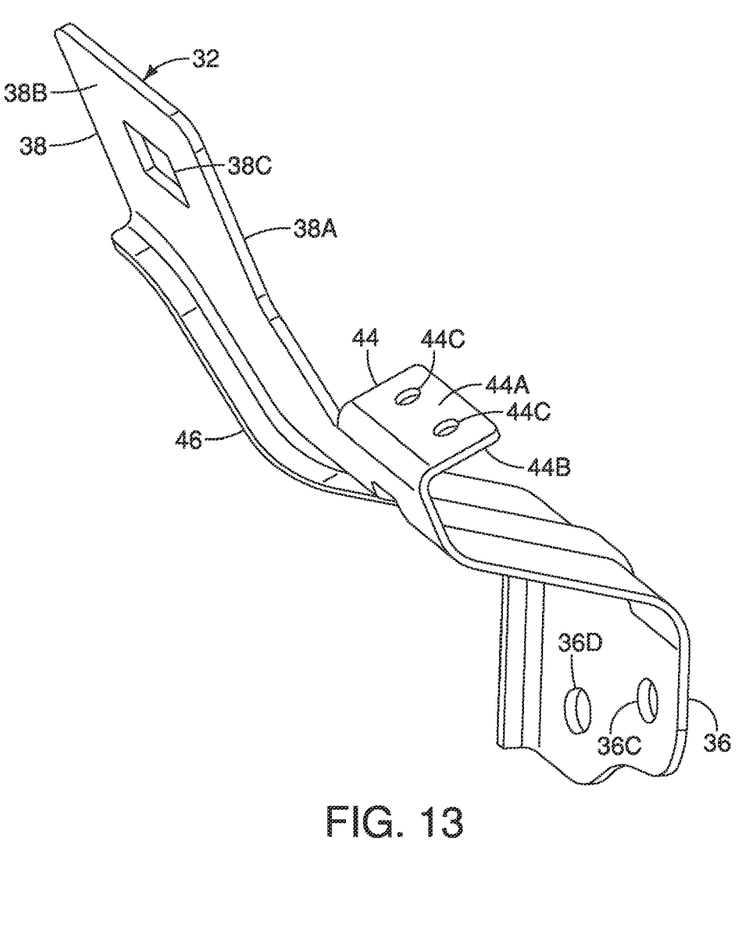
FIG. 13 is a side perspective view of the first bracket member of FIG. 12.

A tab 44 extends outwardly from the second mounting member 38, as shown in FIGS. 9, 12 and 13. The tab 44 extends away from the first surface 38A. In other words, the tab 44 extends in the vehicle outboard direction O (FIG. 5). The tab 44 is a substantially planar member having a first surface 44A and a second surface 44B. The first surface 44A faces upwardly and the second surface 44B faces downwardly when the bracket assembly is mounted to the vehicle frame. At least one fastener 44C opening extends through the tab 44 from the first surface 44A to the second surface 44B. The tab 44 is illustrated having two fastener openings 44C, although the tab 44 can have any suitable number of fastener openings.

A first connecting member 40 connects the first mounting member 36 and second mounting member 38 of the first bracket member 32, as shown in FIGS. 8-13. A first end 40A of the first connecting member 40 is connected to the first mounting member 36. A second end 40B of the first connecting member 40 is connected to the second mounting member 38.

A rib 46 extends outwardly from an edge of the first mounting member 36, the first connecting member 40, and the second mounting member 38 of the first bracket member 32, as shown in FIG. 8. The rib 46 extends in the vehicle inboard direction I, as shown in FIG. 5.

The second bracket member 34, as shown in FIGS. 8-11, 14 and 15, includes a connecting arm 48 and a receiving member 50 connected to the connecting arm 48. The receiving member 50 preferably extends substantially perpendicularly to the connecting arm 48. The second bracket member 34 is preferably unitarily formed as a one-piece member. The second bracket member 34 is made of any suitable material, such as stainless steel.

Figure 14:
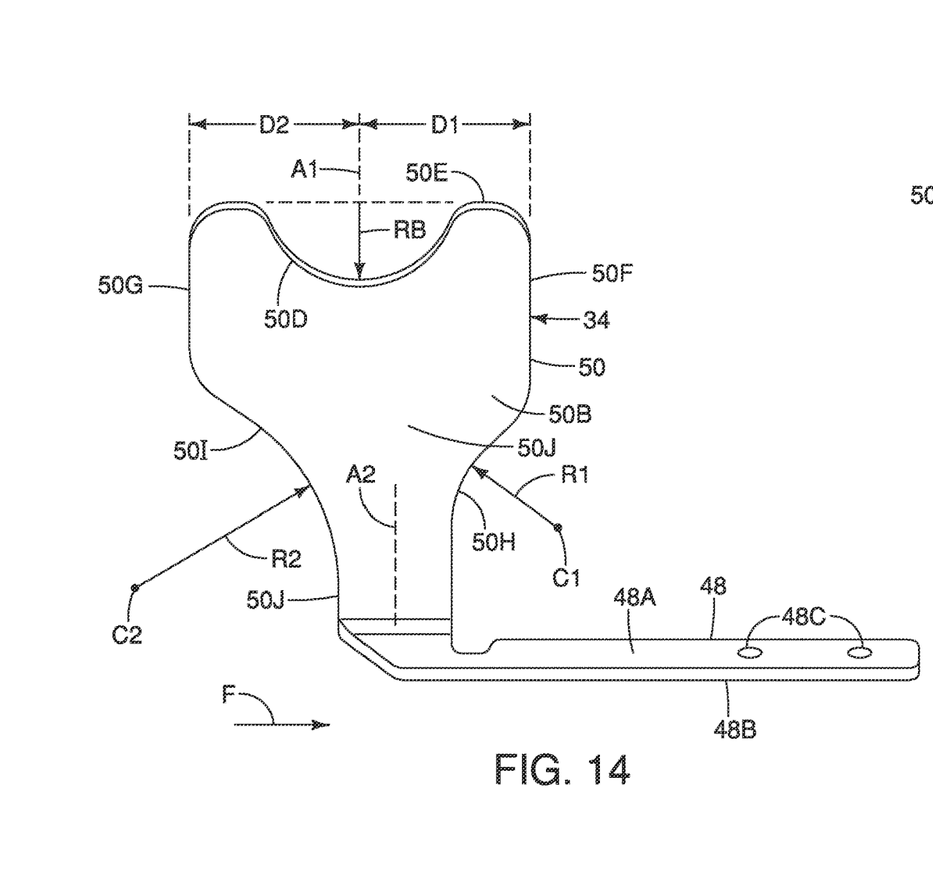
FIG. 14 is a rear perspective view of a second bracket member of the relay box bracket assembly of FIG. 8.
Figure 15:
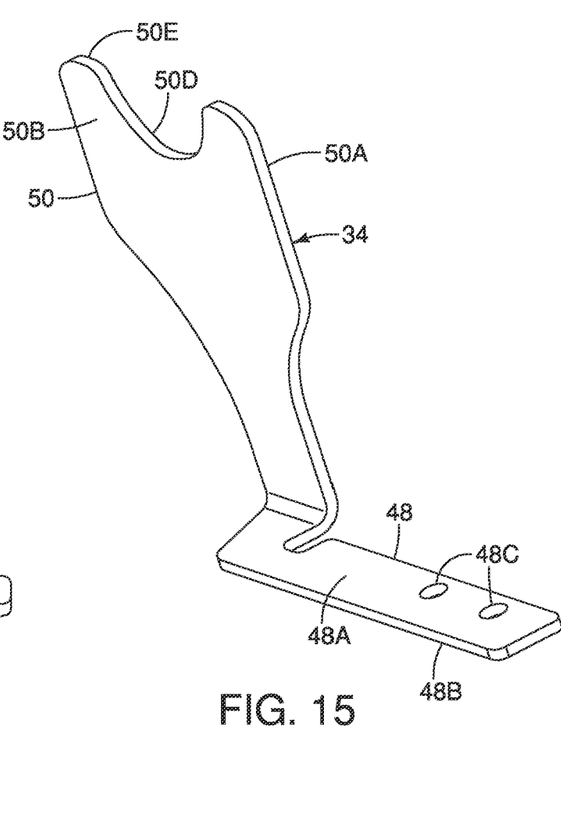
FIG. 15 is a side perspective view of the second bracket member of FIG. 14.

The connecting arm 48 is a substantially planar member having a first surface 48A and a second surface 48B, as shown in FIGS. 14 and 15. At least one fastener opening 48C extends through the connecting arm 48 from the first surface 48A to the second surface 48B. The connecting arm 48 is illustrated having two fastener openings 48C, although the connecting arm can have any suitable number of fastener openings. The fastener openings 48C are configured to receive fasteners 52 to connect the second bracket member 22 to the first bracket member 32. The first surface 48A faces upwardly and the second surface 48B faces downwardly when the bracket assembly 10 is connected to the vehicle frame 12. The connecting arm 48 preferably has the same number of fastener openings 48C as the number of fastener openings in the tab 44 of the first bracket member 32.

The receiving member 50 is a substantially planar member having a first surface 50A and a second surface 50B, as shown in FIGS. 14 and 15. A recess 50D is formed in an upper, or free, end 50E of the receiving member 50 of the second bracket member 34, as shown in FIGS. 8-10, 14 and 15. The recess 50D is preferably curved. Preferably, the recess 50D has a curvature corresponding to a curvature of the electrical wiring harness 16. In other words, a radius RB of the recess 50D is substantially equivalent to a radius RH (FIG. 6) of the electrical wiring harness 16, as shown in FIGS. 6, 8 and 14. The first surface 50A faces in the outboard direction O (FIG. 5) of the vehicle 14 and the second surface 50B faces in the inboard direction I (FIG. 5) of the vehicle 14 when the bracket assembly 10 is connected to the vehicle frame 12.

The receiving member 50 of the second bracket member 34 is asymmetrical relative to a longitudinal axis A1 through a center of the curved recess 50D, as shown in FIGS. 10 and 14. A first distance D1 from the longitudinal axis A1 to a forward edge 50F of the receiving member 50 is preferably substantially equal to a second distance D2 from the longitudinal axis A1 to a rear edge 50G of the receiving member 50. The first distance D1 and the second distance D2 are perpendicular to the longitudinal axis A1. The longitudinal axis A1 of the curved recess 50D is offset from a longitudinal axis A2 of a lower portion 50J of the receiving member 50 in a lengthwise direction of the gap G, as shown in FIG. 14. The lower portion 50J of the receiving member is adjacent the connecting arm 48.

Referring to FIG. 14, a first radius of curvature R1 of a curved portion 50H of a forward edge 50F of the receiving member 50 of the second bracket member 34 is smaller than a second radius of curvature R2 of a curved portion 50I of the rear edge 50G of the receiving member 50. The first radius of curvature R1 is based on a circle approximating the curved portion 50H of the forward edge 50F having a center C1. The second radius of curvature R2 is based on a circle approximating the curved portion 50I of the rear edge 50G having a center C2. The second radius of curvature R2 is larger than the first radius of curvature R1. The second radius of curvature R2 is larger than the first radius of curvature R1 to avoid interference between the rear edge 50G of the second bracket member 34 and components installed in the engine compartment 20 of the vehicle 14 and to avoid interference with the vehicle frame 12.

Referring to FIGS. 6 and 8-11, the second bracket member 34 is connected to the first bracket member 32 to form the bracket assembly 10. The first and second bracket members 32 and 34 are preferably separate components connected by a fastener 52. The fastener openings 44C in the tab 44 of the first bracket member 32 are aligned with the fastener openings 48C in the connecting arm 48 of the second bracket member 34. The second surface 44B of the tab 44 of the first bracket member 32 is adjacent and faces the first surface 48A of the connecting arm 48 of the second bracket member 34. In other words, the tab 44 of the first bracket member 32 is disposed above the connecting arm 48 of the second bracket member 34. Fasteners, such as rivets, 52 are received by the fastener openings 44C in the first bracket member 32 and the fastener openings 48c in the second bracket member 34 to secure the first and second bracket members 32 and 34 together. As shown in FIGS. 3 and 11, the tab 44 and the connecting arm 48 define a lower surface of the gap G. The lower surface of the gap G is configured to receive the electrical wiring harness 16 in the second position as shown in FIG. 3, when the bracket assembly 10 is connected to the frame 12 of the vehicle 14.

As shown in FIGS. 6, 10 and 11, the uppermost end 50E of the second bracket member 34 is disposed higher than an uppermost end 38D of the first bracket member 32. The gap G is defined by the upper surfaces 44A and 48A of the tab 44 and the connecting arm 48, the first surface 38A of the first bracket member 38 and the second surface 50B of the second bracket member 50, as shown in FIGS. 9 and 11. A centerline A1 of the curved recess 50D is offset from a centerline B of the opening 38C in a direction in which the gap G extends. In other words, the centerline A1 is spaced from the centerline B by a distance S in which the gap G extends. As shown in FIG. 10, the gap G extends lengthwise in the longitudinal direction LO of the vehicle 14. The gap G has a width between the second mounting member 38 of the first bracket member 32 and the receiving member 50 of the second bracket member 34 that extends in a lateral direction LA of the vehicle 14, as shown in FIG. 11. The gap G has a width that is preferably larger than a diameter of the electrical wiring harness 16.

As shown in FIGS. 1-3 and 5, the bracket assembly 10 is connected to the frame 12 of the vehicle 14. The fastener openings 36C (FIG. 10) in the first mounting member 36 of the first bracket member 32 receive fasteners 42 to secure the bracket assembly 10 to the frame 12 of the vehicle 14. One of the fastener openings 36D (FIG. 10) can be elongated to facilitate properly positioning the bracket assembly 10. The curved portion 50I (FIG. 14) of the rear edge 50G of the receiving member 50 of the second bracket member 34 prevents interference with the vehicle frame 12 and vehicle components in the engine compartment 20 of the vehicle 14. A forward edge 38E of the second mounting member 38 of the first bracket member 32 is disposed forward of the forward edge 50F of the receiving member 50 of the second bracket member 34 in a forward direction F of the vehicle 14, as shown in FIGS. 1 and 10.

Referring to FIG. 4, the engine 24, the air box 26 and the air duct 28 are installed in the engine compartment 20 before the relay box 18 is installed. The electrical wiring harness 16 and the relay box 18 are disposed in the vehicle in a temporary position different from the installed position. To provide sufficient space for installation of the engine 24, the air box 26 and the air duct 28, the electrical wiring harness 16 and the relay box 18 are maintained in a temporary position, as shown in FIGS. 2 and 3.

FIG. 2 illustrates a first temporary position of the electrical wiring harness 16 and the relay box 18. The electrical wiring harness 16 is received by the recess 50D in the second bracket member 34 of the bracket assembly 10. The electrical wiring harness 16 is further supported by the upper end 38D of the first bracket member 32. The relay box 18 is positioned in the outboard direction from the second bracket member 34. The first position of the electrical wiring harness 16 and the relay box 18 positions the electrical wiring harness 16 and the relay box 18 such that sufficient space in the engine compartment 20 is provided for installation of the engine 24, the air box 26 and the air duct 28 and such that the electrical wiring harness 16 and the relay box 18 do not become misplaced or inaccessible following the installation of the engine 24, the air box 26 and the air duct 28.

FIG. 3 illustrates a second temporary position of the electrical wiring harness 16 and the relay box 18. The electrical wiring harness 16 is received by the gap G between the first bracket member 32 and the second bracket member 34 of the bracket assembly 10. The electrical wiring harness 16 is supported by the upper surfaces of the tab 44 and the connecting arm 48, as shown in FIGS. 1 and 3. The relay box 18 is positioned in a rearward direction R of the vehicle from the first bracket member 32 and the second bracket member 34. The second position of the electrical wiring harness 16 and the relay box 18 positions the electrical wiring harness 16 and the relay box 18 such that sufficient space in the engine compartment 20 is provided for installation of the engine 24, the air box 26 and the air duct 28 and such that the electrical wiring harness 16 and the relay box 18 do not become misplaced or inaccessible following the installation of the engine 24, the air box 26 and the air duct 28.

Upon installation of the engine 24, the air box 26 and the air duct 28 in the engine compartment 20, as shown in FIG. 4, the relay box 18 can then be installed in the installation position, as shown in FIGS. 4-7. The electrical wiring harness 16 and the relay box 18 can be received by the bracket assembly 10 in either the first position (FIG. 2) or the second position (FIG. 3) during installation of the engine 24, the air box 26 and the air duct 82. The relay box 18 has a flexible hook member 18A that is received by the opening 38C in the second mounting member 38 of the first bracket member 32 of the bracket assembly 10. The hook member 18A flexes into the opening 38C when the relay box 18 is properly positioned. Support members 18B of the relay box 18 engage the upper surface 38D of the second mounting member 38 of the first bracket member 32, as shown in FIG. 6, to further support the relay box 18 in the installation position. The electrical wiring harness 16 and the relay box 18 do not contact the second bracket member 34 when the relay box 18 is in the installed position. The bracket assembly 10 facilitates receiving the electrical wiring harness 16 in a temporary position during installation of components in the engine compartment 20, and receives the relay box 18 in an installation position after installation of the components in the engine compartment 20.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the relay box bracket assembly. Accordingly, these terms, as utilized to describe the present invention should be interpreted relative to a vehicle equipped with the relay box bracket assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bracket assembly for a relay box for a vehicle, comprising:
    a first bracket member configured to be mounted to a frame of a vehicle, the first bracket member being configured to receive the relay box in an installed position; and
    a second bracket member connected to the first bracket member,
    a gap being defined between the first bracket member and the second bracket member, the gap being configured to receive an electrical wiring harness connected to the relay box to support the relay box prior to the relay box being mounted in the installed position, and
    a curved recess being formed in a free end of the second bracket member.

2. A bracket assembly for a relay box for a vehicle, comprising:
    a first bracket member configured to be mounted to a frame of a vehicle, the first bracket member being configured to receive the relay box in an installed position; and
    a second bracket member connected to the first bracket member,
    a gap being defined between the first bracket member and the second bracket member, the gap being configured to receive an electrical wiring harness connected to the relay box to support the relay box prior to the relay box being mounted in the installed position; and
    a connecting arm of the second bracket member being connected to a tab of the first bracket member, the connecting arm and the tab defining a surface extending through the gap configured to receive the electrical wiring harness.

3. The bracket assembly according to claim 1, wherein an uppermost end of the second bracket member is disposed higher than an uppermost end of the first bracket member.

4. The bracket assembly according to claim 1, wherein an opening disposed in the first bracket member is configured to receive the relay box in the installed position.

5. The bracket assembly according to claim 1, wherein a center of the curved recess is offset from a center of the opening in a lengthwise direction in which the gap extends.

6. The bracket assembly according to claim 1, wherein a receiving member extends substantially perpendicularly to the connecting arm of the second bracket member.

7. The bracket assembly according to claim 6, wherein the receiving member of the second bracket member is asymmetrical relative to a longitudinal axis through a center of the curved recess.

8. The bracket assembly according to claim 7, wherein a first distance from the longitudinal axis to a forward edge of the receiving member is substantially equal to a second distance from the longitudinal axis to a rear edge of the receiving member, the first and second distances being perpendicular to the longitudinal axis.

9. The bracket assembly according to claim 6, wherein a first radius of curvature of a forward edge of the receiving member of the second bracket member is smaller than a second radius of curvature of a rear edge of the receiving member.

10. A relay box assembly for a vehicle, comprising:
    a vehicle frame;
    a bracket assembly connected to the vehicle frame;
    a relay box connected to the bracket assembly; and
    an electrical wiring harness connected to the relay box;
    the bracket assembly including
        a first bracket member connected to the vehicle frame; and
        a second bracket member connected to the first bracket member,
        a gap being defined between the first bracket member and the second bracket member, the gap being configured to receive the electrical wiring harness connected to support the relay box prior to the relay box being connected to the first bracket member of the bracket assembly,
        the relay box being movable between a first position in which the electrical wiring harness is received by the second bracket member and a second position in which the relay box is connected to the first bracket member.

11. The relay box assembly according to claim 10, wherein
a curved recess disposed in a free end of the second bracket member is configured to receive the electrical wiring harness when the relay box is in the first position, a radius of the curved recess being substantially equal to a radius of the electrical wiring harness.

12. The relay box assembly according to claim 10, wherein
a connecting arm of the second bracket member is connected to a tab of the first bracket member, the connecting arm and the tab defining a surface extending through the gap configured to receive the electrical wiring harness when the relay box is in the first position.

13. The relay box assembly according to claim 10, wherein
an uppermost end of the second bracket member is disposed higher than an uppermost end of the first bracket member.

14. The relay box assembly according to claim 11, wherein
an opening disposed in the first bracket member receives a hook member of the relay box when the relay box is in the second position.

15. The relay box assembly according to claim 10, wherein
a center of the curved recess is offset from a center of the opening in a lengthwise direction in which the gap extends.

16. The relay box assembly according to claim 11, wherein
a receiving member extends substantially perpendicularly to the connecting arm of the second bracket member.

17. The relay box assembly according to claim 16, wherein
the receiving member of the second bracket member is asymmetrical relative to a longitudinal axis through a center of the curved recess.

18. The relay box assembly according to claim 17, wherein
a first distance from the longitudinal axis to a forward edge of the receiving member is substantially equal to a second distance from the longitudinal axis to a rear edge of the receiving member, the first and second distances being perpendicular to the longitudinal axis.

19. The relay box assembly according to claim 16, wherein
a first radius of curvature of a forward edge of the receiving member of the second bracket member is smaller than a second radius of curvature of a rear edge of the receiving member.

* * * * *